United States Patent [19]

Kukes et al.

[11] Patent Number: 4,585,751

[45] Date of Patent: Apr. 29, 1986

[54] HYDROTREATING CATALYSTS

[75] Inventors: Simon G. Kukes; Stephen L. Parrott; Karlheinz K. Brandes, all of Bartlesville, Okla.

[73] Assignee: Phillips Petroleum Company, Bartlesville, Okla.

[21] Appl. No.: 748,113

[22] Filed: Jun. 24, 1985

[51] Int. Cl.$^4$ .............................................. B01J 27/19
[52] U.S. Cl. .................................... 502/211; 502/220; 502/318; 502/321; 502/324; 502/345; 208/216 R; 208/243; 208/244; 208/246; 208/254 H; 208/295; 208/296
[58] Field of Search ............... 502/211, 220, 318, 321, 502/324, 345

[56] References Cited

U.S. PATENT DOCUMENTS

| | | | |
|---|---|---|---|
| 2,890,162 | 6/1959 | Anderson, Jr. et al. | 502/211 |
| 2,895,920 | 7/1959 | Janoski | 252/452 |
| 3,159,564 | 12/1984 | Kelley et al. | 208/59 |
| 3,228,890 | 1/1966 | Eden | 252/437 |
| 3,232,887 | 2/1966 | Peadmisis | 252/435 |
| 3,287,280 | 11/1966 | Colgan et al. | 252/435 |
| 3,345,417 | 10/1967 | Cahoy et al. | 260/604 |
| 3,383,305 | 5/1968 | Rogers et al. | 208/254 |
| 3,575,844 | 8/1971 | Schutt | 208/90 |
| 3,673,079 | 6/1972 | Mulaskey et al. | 502/211 |
| 3,699,036 | 10/1972 | Hass et al. | 208/111 |
| 3,766,054 | 10/1973 | Weisz et al. | 208/89 |
| 3,772,185 | 11/1973 | Chang et al. | 208/251 H |
| 3,915,848 | 10/1975 | Kravitz et al. | 208/216 |
| 3,992,468 | 11/1976 | Cosyns et al. | 502/211 |
| 4,080,313 | 4/1978 | Whittam | 252/455 R |
| 4,295,995 | 10/1981 | Bearden et al. | 252/431 |
| 4,362,653 | 12/1982 | Robinson | 502/211 |
| 4,367,165 | 1/1983 | Assoka et al. | 252/457 |
| 4,371,507 | 2/1983 | Farha et al. | 423/230 |
| 4,422,960 | 12/1983 | Shiroto et al. | 502/206 |
| 4,429,136 | 1/1984 | Daniel | 502/211 |
| 4,439,312 | 3/1984 | Assoka et al. | 502/211 |
| 4,440,631 | 4/1984 | Togari et al. | 502/211 |
| 4,444,655 | 4/1984 | Shiroto et al. | 208/210 |

OTHER PUBLICATIONS

"Comprehensive Inorganic Chemistry", vol. 3, by J. Bailor et al, 1973, Pergamon Press, pp. 57,738,739.
"Inorganic Chemistry", by R. Heslop and P. Robinson, 1967, Elsevier Publ. Co., pp. 666, 667.

Primary Examiner—John Doll
Assistant Examiner—A. Pal
Attorney, Agent, or Firm—K. K. Brandes

[57] ABSTRACT

A catalyst composition is prepared by dissolving a suitable molybdenum and oxygen containing compound (preferably $MoO_3$), a suitable divalent copper and/or manganese compound and a suitable phosphorus and oxygen containing compound (preferably $H_3PO_4$) in water, mixing this solution with an alumina-containing support material, and calcining this mixture. This catalyst composition is used primarily for hydrotreating of hydrocarbon feed streams, which contain sulfur, vanadium and nickel impurities, particularly heavy oils.

14 Claims, No Drawings

HYDROTREATING CATALYSTS

BACKGROUND OF THE INVENTION

In one aspect, this invention relates to a process for preparing a promoted, alumina-based catalyst composition. In another aspect, this invention relates to catalytic hydrotreating of liquid hydrocarbons containing feed streams, in particular heavy oils.

The use of alumina, promoted with transition metals or compounds thereof, for hydrotreating (e.g., demetallizing, desulfurizing, hydrocracking) liquid hydrocarbon feed streams, which contain coke precursors and metal, nitrogen and sulfur impurities, such as heavy petroleum oils and fractions thereof is well known. However, there is an ever present need to develop new methods of preparing such catalysts and to develop new catalysts that are more effective in removing undesirable impurities from such feed streams.

SUMMARY OF THE INVENTION

It is an object of this invention to provide an effective hydrofining catalyst composition. It is another object of this invention to provide a process for preparing a new catalyst composition. It is still another object of this invention to provide a new impregnating solution, to be used primarily for preparing catalyst compositions. It is a further object of this invention to employ a new and effective catalyst for the removal of impurities from heavy hydrocarbon containing oils. Other objects and advantages will be apparent from the detailed description and appended claims.

In accordance with this invention, a composition of matter (suitable as a catalyst composition) containing molybdenum, copper and/or manganese, phosphorus and alumina is prepared by a process comprising the steps of:

(A) mixing (a) at least one molybdenum and oxygen containing compound, (b) at least one compound of at least one transition metal selected from the group consisting of divalent copper and divalent manganese, (c) at least one phosphorus and oxygen containing compound, and (d) water, in such amounts and under such conditions as to obtain a solution;

(B) mixing the solution obtained in step (A) with an alumina-containing support material;

(C) heating the mixture obtained in step (B) at a first temperature under such conditions as to at least partially dry said mixture; and (D) heating (calcining) the at least partially dried mixture obtained in step (C) at a second temperature, which is higher than said first temperature, under such conditions as to activate said mixture.

In one embodiment, the process of this invention comprises a presulfiding step (F) after step (D).

In another embodiment of this invention, an aqueous solution as prepared by step (A) is provided. This solution is preferably used for impregnating substantially inert support materials so as to prepare catalyst compositions.

In still another embodiment of this invention, the catalyst composition prepared by the process of this invention comprising steps (A), (B), (C) and (D) is contacted with a free hydrogen containing gas and a hydrocarbon containing feed stream, which also contains compounds of sulfur, nickel and vanadium, under such conditions as to produce a hydrocarbon containing feed stream having reduced levels of sulfur, nickel and vanadium.

DETAILED DESCRIPTION OF THE INVENTION

Preferably the molybdenum and oxygen containing compound (a) used in step (A) is selected from the group consisting of molybdenum oxides and hydroxides, molybdenum blue, molybdic acids, ammonium and alkali metal orthomolybdates, ammonium and alkali metal dimolybdates, ammonium and alkali metal heptamolybdates, ammonium and alkali metal isomolybdates, phosphomolybdic acid and ammonium salts thereof.

Preferably the transition metal compound (b) used in step (A) is selected from the group consisting of copper-(II) carbonate, manganese(II) carbonate, basic copper-(II) carbonate, basic manganese(II) carbonate, copper-(II) hydrogen carbonate, manganese(II) hydrogen carbonate, copper(II) oxalate, manganese(II) oxalate, copper(II) nitrate, manganese(II) nitrate, copper(II) sulfate, manganese(II) sulfate, copper(II) halides, manganese(II) halides, copper(II) monocarboxylates containing 1–12 carbon atoms, and manganese(II) monocarboxylates containing 1–12 carbon atoms.

Preferably the phosphorus and oxygen containing compound (c) used in step (A) is selected from the group consisting of $H_3PO_4$, $H_4P_2O_7$, $(HPO_3)_n$, $NH_4H_2PO_4$, $LiH_2PO_4$, $NaH_2PO_4$, $KH_2PO_4$, $CsH_2PO_4$, $(NH_4)_2HPO_4$, $Li_2HPO_4$, $Na_2HPO_4$, $K_2HPO_4$, $Rb_2HPO_4$, $Cs_2HPO_4$, $(NH_4)_3PO_4$, $Na_3PO_4$, $K_3PO_4$, $Rb_3PO_4$, $Cs_3PO_4$, ammonium and alkali metal pyrophosphates, ammonium and alkali metal metaphosphates, $H_3PO_3$, ammonium and alkali metal phosphites.

It is presently preferred to carry out step (A) under such conditions and using such amounts of (a), (b), (c) and (d) as to obtain a substantially clear solution. It is believed that this solution comprises at least one of divalent copper and manganese cations (i.e., $Cu^{+2}$ and $Mn^{+2}$), molybdenum and oxygen containing anions, and phosphorus and oxygen containing anions. However, it is within the scope of this invention to obtain a solution having solid particles dispersed therein. In this case, the solution plus dispersed particles can be used as is in step (B), or preferably, the dispersed solid particles are separated from the solution by any suitable separation means such as filtration, centrifugation or settling and subsequent draining before step (B).

The presently most preferred molybdenum compound is $MoO_3$; the presently most preferred copper(II) compound is $Cu_2(OH)_2CO_3$ (basic copper carbonate); the presently most preferred manganese(II) compound is $Mn_2C_2O_4$ (manganese oxalate), and the most preferred phosphorus compound is $H_3PO_4$. The solution obtained in step (A) preferably contains the following concentrations of Mo, Cu and/or Mn and P, given as the number of gram-atomic weights (herein referred to as mole) per liter of solution:

|  | Broad | Intermediate | Narrow |
| --- | --- | --- | --- |
| Mole/l of Mo | 0.002–1.0 | 0.005–0.5 | 0.02–0.2 |
| Mole/l of Cu (when used) | 0–0.5 | 0.002–0.2 | 0.005–0.1 |
| Mole/l of Mn (when used) | 0–0.5 | 0.002–0.2 | 0.005–0.1 |
| Mole/l of (Cu plus Mn) | 0.001–0.5 | 0.002–0.2 | 0.005–0.1 |
| Mole/l of P | 0.005–5.0 | 0.005–1.0 | 0.01–0.25 |

In one embodiment of this invention, the solution obtained in step (A) is provided and is used as is for purposes other than making alumina-based catalysts. For instance, it can be used for impregnating substantially inert materials such as silica, alumino silicates (e.g., zeolites), titania, metal phosphates and the like, so as to make a variety of catalysts, preferably for hydrogenation and hydrocracking reactions. However, it is within the scope of this invention to use this solution for purposes other than catalyst preparation. Solid particles dispersed in the solution can be removed by the above-described separation means.

The alumina-containing support material employed in step (B) can be substantially pure alumina or partially hydrated forms thereof. Preferably the alumina-containing support material is a finely divided solid. Generally the surface area (determined by BET/$N_2$; ASTM D3037) of the alumina-containing material ranges from about 20 $m^2$/g to about 350 $m^2$/g. The support material may contain transition metals (e.g., Mo) or compounds thereof, usually at a level of less than 1 weight-% metals, based on the weight of the entire alumina-containing support material (before impregnation). It is within the scope of this invention to employ mixtures of alumina and other inorganic refractory materials such as silica, alumino-silicates, magnesia, titania, zirconia, aluminum phosphate, zirconium phosphate and the like. If a phosphate is present, the amount is generally less than 5 weight-% P, based on the weight of the alumina-containing support material (before impregnation).

The drying step (C) is generally carried out in air or an inert gas, at a temperature ranging from about 25° C. to about 200° C. (preferably 50°-100° C.) so as to remove the greatest portion of water from the mixture obtained in step (B). Vacuum conditions may be employed but are presently not preferred. The at least partially dried mixture generally contains less than about 20 weight-% water. The rate of drying is controlled so as to avoid surges of water vapor that can cause the impregnating solution to splatter and to excessively accumulate in certain surface regions of the solid support material. Depending on the drying temperature and specific drying conditions (such as extent of air movement; thickness of the solid layer to be dried), the drying time ranges generally from about 0.5 hour to about 100 hours, preferably from about 1 hour to about 30 hours.

The preferred heating (calcining) conditions in step (D) comprise heating in a non-reducing gas atmosphere, a temperature ranging from about 200° C. to about 600° C. (more preferably from about 300° C. to about 600° C.) and a heating time ranging from 1 to about 10 hours. A presently preferred specific calcining program is described in Example I. Generally the heating is carried out in a free oxygen containing atmosphere, preferably air. But other non-reducing gases, e.g., nitrogen, helium, neon, argon, krypton, xenon or mixtures thereof, may also be employed.

It is presently believed that the activation occurring in calcinating step (D) is the result of an at least partial conversion of the metal compounds of step (A) to oxidic compounds and/or phosphates of these metals. The terms "activate" and "activation" as used herein means that the calcined catalyst composition of this invention is a more effective catalyst for hydrotreating reactions, particularly hydrodemetallization and hydrodesulfurization of liquid hydrocarbon containing feed streams, than the at least partially dried mixture obtained in step (C).

The thus calcined catalyst compositions generally contain from about 0.1 to about 5.0, preferably from about 0.3 to about 2.0 weight-% Mo, based on the weight of the entire catalyst composition; from about 0.02 to about 2.5, preferably from about 0.05 to about 1.0, weight-% of at least one of Cu and Mn, based on the weight of the entire catalyst composition; and from about 0.001 to about 10, preferably from about 0.01 to about 6.0, weight-% P based on the weight of the entire catalyst composition. The surface area (determined by the BET/$N_2$ method; ASTM D3037) of the calcined catalyst composition of this invention ranges from about 20 to about 350 $m^2$/g, preferably from about 100 to about 250 $m^2$/g. The catalyst composition can be pelletized or compacted into various shapes (e.g., spherical, cylindrical or trilobal) for convenient shipping and use in fixed catalyst beds.

In one embodiment, the calcined catalyst composition of this invention is presulfided by the additional step (F) of contacting the calcined catalyst composition with a suitable sulfur compound under such conditions as to at least partially convert the transition metal compounds contained in the calcined catalyst composition to sulfides. This can be accomplished by passing a sulfur-containing gas oil or a solution of COS or mercaptans or organic sulfides, e.g., in a hydrocarbon solvent, over the catalyst composition at an elevated temperature (e.g., at 300°-650° F.), generally in the presence of hydrogen gas. Or a gaseous mixture of hydrogen and hydrogen sulfide (e.g. at a volume ratio of about 10:1) can be passed over the catalyst composition at an elevated temperature, preferably 1-15 hours at about 400° F. and then 1-15 hours at about 700° F. This presulfiding step is particularly desirable when the catalyst composition of this invention is used for hydrotreating or hydrocracking of liquid hydrocarbon containing feed streams.

The composition of matter of this invention can be used as a catalyst composition for a variety of reactions such as hydrocarbon conversion reactions. In one preferred embodiment of this invention, the catalyst composition of this invention is used as a catalyst for hydrotreating substantially liquid hydrocarbon containing feed streams, which also contain compounds of sulfur, nickel and vanadium as impurities, and generally also asphaltenes, coke precursors (measured as Ramsbottom carbon residue) and nitrogen compounds. Suitable hydrocarbon containing feed streams include crude oil and fraction thereof, petroleum products, heavy oil extracts, coal pyrolyzates, liquefied coal products, products from tar sands, shale oil and shale oil products. The catalyst compositions are particularly suited for treating heavy topped crudes and heavy oil residua, which generally has an initial boiling point in excess of about 400° F., preferably in excess of about 600° F., containing about 10–1000 ppmw (parts per million by weight) of vanadium, about 5–500 ppmw of nickel, about 0.5–5 weight-% sulfur, about 0.2–2 weight-% nitrogen, and having an API$^{60}$ gravity of about 5–25.

The hydrotreating process employing the catalyst composition of this invention is carried out in any apparatus whereby an intimate contact of the catalyst composition with said hydrocarbon containing feed stream and a free hydrogen containing gas is achieved, under such conditions as to produce a hydrocarbon containing product having a reduced level of nickel, vanadium and sulfur. Generally, a lower level of nitrogen and Ramsbottom carbon residue and a higher value of API$^{60}$ gravity are also attained in this hydrotreating process. The hydrotreating process can be carried out using a fixed catalyst bed (presently preferred) or a fluidizied catalyst bed or a moving catalyst bed or an agitated slurry of the catalyst in the oil feed (hydrovisbreaking operation). The hydrocarbon hydrotreating process can be carried out as a batch process or, preferably, as a continuous process.

The catalyst composition of this invention can be used in said hydrocarbon hydrotreating process alone in a reactor or may be used in combination with essentially inert materials such as alumina, silica, titania, magnesia, silicates, metal aluminates, alumino-silicates (e.g., zeolites), titania and metal phosphates. Alternating layers of the inert material and of the catalyst composition can be used, or the catalyst composition can be mixed with the inert material. Use of the inert material with the catalyst composition provides for better dispersion of the hydrocarbon containing feed stream. Also, other catalysts such as known hydrogenation and desulfurization catalysts (e.g., $NiO/MnO_3$, $CoO/MoO_3$ and $NiO/CoO/MoO_3$ on alumina) may be used with the catalyst composition of this invention to achieve simultaneous demetallization, desulfurization, denitrogenation, hydrogenation and hydrocracking, if desired. In one embodiment of said hydrocarbon hydrotreating process, the catalyst composition has been presulfided as described above before being used.

Any suitable reaction time between the catalyst composition, the hydrocarbon containing feed stream and hydrogen gas can be utilized. In general, the reaction time will range from about 0.05 hours to about 10 hours. Preferably, the reaction time will range from about 0.4 to about 5 hours. Thus, the flow rate of the hydrocarbon containing feed stream should be such that the time required for the passage of the mixture through the reactor (residence time) will preferably be in the range of about 0.4 to about 5 hours. In a continuous fixed bed operation, this generally requires a liquid hourly space velocity (LHSV) in the range of about 0.10 to about 20 cc of feed per cc of catalyst per hour, preferably from about 0.2 to about 2.5 cc/cc/hr.

The hydrotreating process employing the catalyst composition of the present invention can be carried out at any suitable temperature. The temperature will generally be in the range of about 250° C. to about 550° C. and will preferably be in the range of about 350° C. to about 450° C. Higher temperatures do improve the removal of metals, but temperatures which will have adverse effects on the hydrocarbon containing feed stream, such as excessive coking, will usually be avoided. Also, economic considerations will usually be taken into account in selecting the operating temperature. Lower temperatures can generally be used for lighter feeds.

Any suitable pressure may be utilized in the hydrotreating process. The reaction pressure will generally be in the range of about atmospheric pressure to up to about 5,000 psig. Preferably, the pressure will be in the range of about 100 to about 2500 psig. Higher pressures tend to reduce coke formation but operating at high pressure may be undesirable for safety and economic reasons.

Any suitable quantity of hydrogen can be added to the hydrotreating process. The quantity of hydrogen used to contact the hydrocarbon containing feed stock will generally be in the range of about 100 to about 10,000 standard cubic feet $H_2$ per barrel of the hydrocarbon containing feed stream and will more preferably be in the range of about 1000 to about 6000 standard cubic feet $H_2$ per barrel of the hydrocarbon containing feed stream.

In general, the catalyst composition is utilized primarily for demetallization until a satisfactory level of metals (Ni, V) removal is no longer achieved. Catalyst deactivation generally results from the coating of the catalyst composition with coke and metals removed from the feed. It is possible to remove the metals from the catalyst. But it is generally contemplated that once the removal of metals falls below a desired level, the spent (deactivated) catalyst will simply be replaced by fresh catalyst.

The time in which the catalyst composition of this invention will maintain its activity for removal of metals and sulfur will depend upon the metals concentration in the hydrocarbon containing feed streams being treated. Generally the catalyst composition can be used for a period of time long enough to accumulate about 20–200 wt. % of metals, mostly Ni and V, based on the initial weight of the catalyst composition, from the hydrocarbon containing feed. In other words, the weight of the spent catalyst composition will be about 20–200% higher than the weight of the fresh catalyst composition.

Generally, at least a portion of the hydrotreated product stream having reduced metal and sulfur contents is subsequently cracked in a cracking reactor, e.g. in a fluidized catalytic cracking unit, under such conditions as to produce lower boiling hydrocarbon materials (i.e., having a lower boiling range at 1 atm. than the feed hydrocarbons) suitable for use as gasoline, diesel fuel, lubricating oils and other useful products. It is within the scope of this invention to hydrotreat said product stream having reduced metal and sulfur contents in one or more processes using different catalyst compositions, such as alumina-supported $NiO/MoO_3$ or $CoO/MoO_3$ catalysts, for further removal of sulfur and other impurities, before the product stream is introduced into the cracking reactor.

A further embodiment of this invention is a hydrofining process comprising the step of introducing at least one decomposable metal compound into the hydrocarbon containing feed stream prior to its being contacted with the catalyst composition of this invention. The metal in the decomposable metal compound is selected from the group consisting of the metals of Group IV-B, Group V-B, Group VI-B, Group VII-B, Group VIII and IB of the Periodic Table (as defined in "College Chemistry" by Nebergall et al, D. C. Heath and Company, 1972). Preferred metals are molybdenum, tungsten, manganese, chromium, zirconium and copper. Molybdenum is a particularly preferred metal which may be introduced as a carbonyl, acetate, acetylacetonate, carboxylate (e.g., octoate), naphthenate, mercaptides, dithiophosphate or dithiocarbamate. Molybdenum hexacarbonyl, molybdenum dithiophosphate and molybdenum dithiocarbamate are particularly preferred additives. The life of the catalyst composition and the efficiency of the demetallization process is improved by introducing at least one of the above-cited decomposable metal compounds into the hydrocarbon containing feed, which also contains metals such as nickel and vanadium. These additives can be added continuously or intermittently and are preferably added at a time when the catalyst composition of this invention has been partially deactivated so as to extend its life.

Any suitable concentration of the additive may be added to the hydrocarbon containing feed stream. In general, a sufficient quantity of the additive will be added to the hydrocarbon containing feed stream to result in a concentration of the metal (preferably molybdenum) in said decomposable compounds ranging from about 1 to about 1000 parts per million and more preferably in the range of about 5 to about 100 parts per million in the feed stream.

The following examples are presented in further illustration of the invention and are not to be considered as unduly limiting the scope of this invention.

EXAMPLE I

This example illustrates the preparation of several alumina-supported, molybdenum-containing hydrofining catalysts.

Catalyst A (Invention)

This catalyst was prepared by impregnation of alumina with a solution containing Cu and Mo compounds and phosphoric acid. First, 25.5 grams of $MoO_3$ and 100 mL of distilled water were added to a 250 mL Erlenmeyer flask. Then 7.7 grams of 85% $H_3PO_4$ were charged. The total mixture was heated at the boiling point for about 10 minutes with stirring. Thereafter, 8.2 grams of basic copper(II) carbonate were added to the hot solution over a period of 10 minutes. This mixture was heated about 10 minutes at the boiling temperature until it became a clear solution. The final weight of the solution was 126.8 grams. One gram of this solution contained 0.034 g Cu, 0.134 g Mo and 0.016 g P.

2.94 of the Cu-Mo-$PO_4$ solution was diluted with distilled water to a total volume of 71 mL and then mixed with 78.0 grams of alumina (marketed by American Cyanamid Company, Wayne, NJ, under the product designation SN 5982; BET/$N_2$ surface area: 171 $m^2$/g; mercury pore volume: 0.94 cc/g). The mixture was stirred for several minutes, left in an open dish at room temperature for about 30 minutes and was then dried under a heat lamp for about 3 hours. The total weight of the dried material was 137.4 grams. Equal portions of about 45.8 grams each were then dried/calcined under different conditions. Catalyst $A_1$ was heated in air at about 300° F. for about 20 hours; Catalyst $A_2$ was heated in air as follows: 100° F.→400° F. within 30 minutes; 2 hours at 400° F.; 400° F.→500° F. within 30 minutes; 1 hour at 500° F.; 500° F.→800° F. within 30 minutes; 3 hours at 800° F.; 800° F.→room temperature within 2 hours. Catalyst $A_3$ was heated in air as follows: 100° F.→400° F. within 30 minutes; 2 hours at 400° F.; 400° F.→500° F. within 30 minutes; 1 hour at 500° F.; 500° F.→800° F. within 30 minutes; 3 hours at 800° F.; 800° F.→1200° F. within about 30 minutes; 3 hours at 1200° F.; 1200° F.→room temperature within about 2 hours. Finished catalyst compositions $A_1$, $A_2$ and $A_3$ contained 0.13 weight-% Cu, 0.50 weight-% Mo and 0.06 weight-% P.

Catalyst B (Invention)

This catalyst was prepared by impregnation of alumina with Mn and Mo compounds and $H_3PO_4$. First, 25.5 grams of $MoO_3$ and 100 mL of distilled water were added to a 250 mL Erlenmeyer flask. Then 5.0 grams of 85% $H_3PO_4$ were charged; and the mixture was heated at the boiling point for about 10 minutes. Thereafter, 12.44 grams of Mn(II) $MnC_2O_4.2H_2O$ (manganese(II) oxalate) were charged to the flask. The total mixture was heated again at the boiling point for about 10 minutes. The final weight of the solution was 94.3 grams. One gram of this solution contained 0.041 g Mn, 0.180 g Mo and 0.014 g P.

0.73 g of the Mn-Mo-$PO_4$ solution was diluted with distilled water to a total volume of 24 mL and mixed with 26.0 grams of SN 5982 alumina. The mixture was stirred for several minutes, left in an open dish at room temperature for about 1 hour and was the dried/calcined according to the procedure described for Catalyst $A_2$. The finished Catalyst B contained 0.11 weight-% Mn, 0.50 weight-% Mo and 0.04 weight-% P.

Catalyst C (Control)

This catalyst contained 0.5 weight-% Mo on alumina. It was prepared by dissolving 0.52 grams of $(NH_4)_6Mo_7O_{24}.4H_2O$ in enough distilled water to make a solution of 51 mL volume, which was poured onto 56 grams of SN 5982 alumina. The mixture was stirred for a couple of minutes and was dried/calcined in accordance with the procedure described for Catalyst $A_2$.

Catalyst D (Control)

This catalyst contained 0.12 weight-% Ni, 0.50 weight-% Mo and 0.05 weight-% P. A solution containing 0.06 g Ni, 0.25 g Mo and 0.025 g P (as phosphate) was prepared substantially in accordance with those used for Catalyst A, except that nickel carbonate was used (in lieu of basic copper carbonate). 1.12 gram of the above solution was diluted with distilled water to make a total volume of 51 mL, which was then poured onto 56 grams of SN 5982 alumina. The mixture was stirred for a few minutes and then dried/calcined in accordance with the procedure described for Catalyst $A_2$.

Catalyst E (Control)

This catalyst contained 0.14 weight-% Zn, 0.50 weight-% Mo and 0.09 weight-P. A solution containing 0.039 g Zn, 0.144 g Mo and 0.026 g P was prepared substantially in accordance with the procedure for Catalyst A, except that 8.1 grams of basic zinc carbonate was used (in lieu of basic copper carbonate) and the amount of 85% $H_3PO_4$ was 11.5 grams. 0.91 grams of the above solution was diluted with distilled water to a total volume of 25 mL solution, which was stirred for several minutes with 26.0 g of SN 5982 alumina and dried/calcined in accordance with the procedure described for Catalyst $A_2$.

EXAMPLE II

In this example the automated experimental setup for investigating the hydrofining of heavy oils in accordance with the present invention is described. Oil was pumped downward through an induction tube into a trickle bed reactor, 28.5 inches long and 0.75 inches in diameter. The oil pump used was a reciprocating pump with a diaphragm-sealed head. The oil induction tube extended into a catalyst bed (located about 3.5 inches below the reactor top) comprising a top layer of about 40 cc of low surface area α-alumina (14 grit Alundum; surface area less than 1 $m^2$/gram), a middle layer of 33.3 cc of one of the hydrofining catalysts described in Example I mixed with 85 cc of 36 grit Alundum, and a bottom layer of about 30 cc of α-alumina.

The oil feed was a Maya 400F+ residuum containing about 4.0 weight-% sulfur, 62 ppmw (parts per million by weight) nickel, 302 ppmw vanadium, 12.7 weight-% Ramsbottom carbon residue, 0.44 weight-% nitrogen, and having an API[60] gravity of 12.7.

Hydrogen was introduced into the reactor through a tube that concentrically surrounded the oil induction tube but extended only as far as the reactor top. The reactor was heated with a 3-zone furnace. The reactor temperature was measured in the catalyst bed at three different locations by three separate thermocouples embedded in an axial thermocouple well (0.25 inch outer diameter). The liquid product oil was generally collected every day for analysis. The hydrogen gas was vented. Vanadium and nickel contents were determined by plasma emission analysis; and the sulfur content was measured by X-ray fluorescence spectrometry; Ramsbottom carbon residue was determined in accordance with ASTM D524; and N content was measured in accordance with ASTM D3228.

EXAMPLE III

This example illustrates the removal of metals (Ni, V) and sulfur from a heavy feed (Maya 400F+) by hydrotreatment in the presence of Catalysts $A_2$, B, C, D and E. Pertinent process conditions and test results are summarized in Table I. Only truly comparable run samples obtained at LHSV (cc feed per hour cc catalyst) values ranging from about 0.9 to about 1.1 after run times of at least 2 days are listed. All tested catalysts were calcined according to the same procedure.

TABLE I

| Run | Catalyst | Hours on Stream | Temp. (°F.) | Flow Rate (LHSV) | % Removal of S | % Removal of (Ni + V) | Wt % Metal Loading on Catalyst |
|---|---|---|---|---|---|---|---|
| 1 | $A_2$ (Invention) | 50 | 750 | 1.07 | 35.9 | 63.6 | 2.3 |
|   |   | 75 | 750 | 1.11 | 62.8[1] | 63.7 | 3.6 |
|   |   | 101 | 750 | 1.11 | 31.7 | 63.1 | 4.9 |
|   |   | 150 | 750 | 0.90 | 44.7 | 72.0 | 7.3 |
|   |   | 176 | 750 | 1.03 | 38.8 | 67.1 | 8.6 |
|   |   | 202 | 750 | 0.97 | 45.0 | 70.8 | 9.9 |
|   |   | 229 | 750 | 0.95 | 45.2 | 72.4 | 11.2 |
|   |   | 281 | 750 | 0.98 | 43.9 | 71.8 | 13.8 |
|   |   | 308 | 750 | 1.02 | 43.9 | 71.4 | 15.2 |
| 2 | B (Invention) | 54 | 750 | 0.98 | 37.2 | 64.0 | 2.6 |
|   |   | 79 | 750 | 0.95 | 39.0 | 65.5 | 3.8 |
|   |   | 103 | 750 | 1.05 | 41.3 | 65.8 | 5.1 |
|   |   | 150 | 750 | 1.01 | 41.7 | 67.1 | 8.1 |
|   |   | 173 | 750 | 1.02 | 36.2 | 65.8 | 9.3 |
|   |   | 196 | 750 | 1.04 | 43.0 | 67.6 | 10.5 |
|   |   | 218 | 750 | 0.97 | 45.1 | 68.7 | 11.6 |
|   |   | 243 | 750 | 0.99 | 43.3 | 70.1 | 12.9 |
|   |   | 263 | 750 | 0.99 | 45.6 | 69.3 | 14.0 |
|   |   | 288 | 750 | 0.97 | 44.3 | 68.8 | 15.3 |
| 3 | C (Control) | 51 | 750 | 1.02 | 39.8 | 60.3 | 2.3 |
|   |   | 76 | 750 | 1.07 | 36.3 | 59.0 | 3.4 |
|   |   | 101 | 750 | 1.03 | 36.3 | 62.5 | 4.6 |
|   |   | 126 | 750 | 1.03 | 38.8 | 65.3 | 5.8 |
|   |   | 176 | 750 | 0.99 | 39.0 | 68.7 | 8.2 |
|   |   | 200 | 750 | 1.02 | 57.3[1] | 73.7[1] | 9.5 |
|   |   | 228 | 750 | 0.99 | 39.5 | 69.8 | 10.9 |
|   |   | 255 | 750 | 0.91 | 45.9 | 71.5 | 12.2 |
|   |   | 281 | 750 | 0.91 | 37.0 | 72.5 | 13.4 |
|   |   | 307 | 750 | 0.91 | 46.0 | 73.3 | 14.7 |
|   |   | 330 | 750 | 1.02 | 38.8 | 70.1 | 15.8 |
| 4 | D (Control) | 47 | 750 | 1.02 | 33.8 | 55.1 | 2.0 |
|   |   | 71 | 750 | 1.02 | 32.2 | 53.4 | 2.9 |
|   |   | 95 | 750 | 1.02 | 25.7 | 65.5 | 4.8 |
|   |   | 119 | 750 | 0.96 | 27.3 | 68.7 | 6.0 |
|   |   | 143 | 750 | 0.96 | 30.4 | 72.6 | 7.3 |
|   |   | 167 | 750 | 0.96 | 33.8 | 73.6 | 8.6 |
|   |   | 191 | 750 | 0.96 | 28.8 | 74.9 | 9.9 |
|   |   | 215 | 750 | 0.96 | 32.2 | 75.8 | 11.3 |
| 5 | E (Control) | 70 | 750 | 0.94 | 28.2 | 60.9 | 4.3 |
|   |   | 94 | 750 | 0.99 | 32.4 | 60.9 | 5.4 |
|   |   | 118 | 750 | 0.99 | 30.3 | 62.0 | 6.5 |
|   |   | 139 | 750 | 0.98 | 31.8 | 62.4 | 7.4 |
|   |   | 163 | 750 | 1.02 | 24.6 | 64.7 | 8.6 |

[1]Result believed to be erroneous.

Data in Table I show that at run times up to about 5 days (120 hours), the two invention Catalysts $A_2$ and B generally exhibited greater demetallization activities than three control catalysts (C, D, E). After the initial period of about 5 days, the initial activity difference of the various catalysts apparently were obscured by the increases in demetallization activity due to the deposition of vanadium and nickel from the oil feed onto the hydrofining catalysts. In addition, during the entire runs invention catalysts $A_2$ and B were generally more effective in removing sulfur from the heavy oil feed than the control catalysts, especially catalysts D and E.

EXAMPLE IV

This example illustrates the effect of the calcination temperature on the demetallization activity of the alumina-supported Cu-Mo-PO$_4$ catalyst of this invention. Hydrofining conditions and results for Catalysts $A_1$, $A_2$ and $A_3$ are summarized in Table II.

TABLE II

| Run | Catalyst | Hours on Stream | Temp. (°F.) | Flow Rate (LHSV) | % Removal of S | % Removal of (Ni + V) | Wt % Metal Loading on Catalyst |
|---|---|---|---|---|---|---|---|
| 2 | $A_2$ calcined at 800° F. | 50 | 750 | 1.07 | 35.9 | 63.6 | 2.3 |
|   |   | 75 | 750 | 1.11 | 62.8[1] | 63.7 | 3.6 |
|   |   | 101 | 750 | 1.11 | 31.7 | 63.1 | 4.9 |
|   |   | 150 | 750 | 0.90 | 44.7 | 72.0 | 7.3 |
|   |   | 176 | 750 | 1.03 | 38.8 | 67.1 | 8.6 |
|   |   | 202 | 750 | 0.97 | 45.0 | 70.8 | 9.9 |
|   |   | 229 | 750 | 0.95 | 45.2 | 72.4 | 11.2 |
|   |   | 281 | 750 | 0.98 | 43.9 | 71.8 | 13.8 |
|   |   | 308 | 750 | 1.02 | 43.9 | 71.4 | 15.2 |
| 6 | $A_1$ calcined at 300° F. | 48 | 750 | 1.00 | 30.7 | 59.6 | 2.0 |
|   |   | 72 | 750 | 0.87 | 17.9[1] | 61.5 | 2.9 |
|   |   | 120 | 750 | 0.88 | 25.5 | 62.0 | 4.7 |
|   |   | 170 | 750 | 1.10 | 25.2 | 61.8 | 7.2 |
|   |   | 218 | 750 | 1.10 | 23.1 | 64.3 | 10.1 |
|   |   | 242 | 750 | 1.01 | 27.1 | 65.9 | 11.2 |
|   |   | 262 | 750 | 1.06 | 31.9 | 66.1 | 12.2 |
| 7 | $A_3$ calcined at 1200° F. | 48 | 750 | 0.95 | 28.2 | 61.4 | 2.2 |
|   |   | 72 | 750 | 0.98 | 24.9 | 61.9 | 3.2 |
|   |   | 90 | 750 | 1.07 | 25.2 | 61.9 | 4.1 |
|   |   | 188 | 750 | 1.00 | 33.3 | 67.6 | 10.6 |
|   |   | 212 | 750 | 0.94 | 31.2 | 66.9 | 11.7 |
|   |   | 236 | 750 | 0.91 | 43.3[1] | 71.9 | 12.8 |
|   |   | 260 | 750 | 0.99 | 35.6 | 66.1 | 13.9 |

[1]Result believed to be erroneous.

Data in Table II show that the alumina-supported Cu-Mo-PO$_4$ catalyst that was calcined at 800° F. was surprisingly more effective in removing metals and sulfur from the heavy oil than the same catalyst calcined at either 300° F. or 1200° F. Based on these results, it is presently preferred that calcination temperatures ranging from about 400° F. to about 1100° F. are used as being most effective regarding the demetallization/desulfurization activities of the alumina-supported Cu-Mo-PO$_4$ and Mn-Mo-PO$_4$ catalysts of this invention.

EXAMPLE V

This example demonstrates the criticality of the choice of the ingredients in the impregnating solution used for the preparation of invention Catalyst A. As described in Example I, a substantially clear solution was obtained when MoO$_3$, H$_3$PO$_4$ and Cu$_2$(OH)$_2$CO$_3$ were mixed with water. In one control lab test, the same amounts of MoO$_3$ and Cu$_2$(OH)$_2$CO$_3$ as used in Example I were mixed with water, but the addition of H$_3$PO$_4$ was deleted. Result: the compounds did not dissolve.

In a second control lab test, the same amounts of Cu$_2$(OH)$_2$CO$_3$ and H$_3$PO$_4$ as used in Example I were mixed with water, but the addition of MoO$_3$ was deleted. Result: no clear solution was obtained.

In a third control lab test, the same amounts of Cu$_2$(OH)$_2$CO$_3$ and MoO$_3$ as used in Example I were used, but 5.0 grams of citric acid was used in lieu of H$_3$PO$_4$. Results: the compounds did not dissolve.

These tests show that in the preferred embodiment of this invention, a specific combination of a copper(II) compound (and/or a manganese(II) salt), a molybdenum oxide and phosphoric acid is required to make the clear impregnating solutions employed for preparing invention Catalysts A and B.

EXAMPLE VI

This example illustrates the effect of the addition of small amounts of a decomposable molybdenum compound, Mo(CO)$_6$, to an undiluted Monagas pipeline oil feed containing about 336 ppm V and about 87 ppm Ni on the removal of these metals in the presence of a commercial hydrofining catalyst containing about 0.9 weight-% CoO, 0.5 weight-% NiO, 7.3 weight-% MoO and about 91 weight-% Al$_2$O$_3$, having a surface area of about 180 m$^2$/g). LHSV of the feed for both runs ranged from about 1.0 to 1.1 cc/cc catalyst/hr, the temperature was about 765° C. (407° C.), the pressure was about 2250 psig, and the hydrogen feed rate was about 4800 SCF/barrel oil. Experimental data are summarized in Table III.

TABLE III

| Days on Stream | PPM Mo in Feed | % Removal of (Ni + V) | PPM Mo in Feed | % Removal % (Ni + V) |
|---|---|---|---|---|
| 5 | 0 | 64 | 17 | 72 |
| 12-13 | 0 | 62 | 17 | 71 |
| 17 | 0 | 59 | 7 | 70 |
| 20-21 | 0 | 61 | 7 | 65 |
| 26 | 0 | 58 | 7 | 64 |
| 32-33 | 0 | 53 | 7 | 65 |
| 41 | 0 | 52 | 7 | 70 |
| 52-53 | 0 | 41 | 7 | 66 |
| 58-59 | 0 | 43 | 4 | 65 |

Data in Table III clearly show the beneficial effect of added small amounts of Mo (as Mo(CO)$_6$) to the feed on the demetallization of the oil when a commercial hydrofining catalyst was used. Based on these results, it is presently preferred to introduce a decomposable compound such as Mo(CO)$_6$ into the feed that is hydrotreated with catalyst compositions of this invention.

Reasonable variations and modifications are possible within the scope of the disclosure and the appended claims.

We claim:

1. A process for preparing a composition of matter comprising the steps of:
    (A) mixing (a) at least one molybdenum and oxygen containing compound, (b) at least one compound of divalent copper, (c) at least one phosphorus and oxygen containing compound, and (d) water, in such amounts and under such conditions as to obtain a solution;
    (B) mixing the solution obtained in step (A) with an alumina-containing material;

(C) heating the mixture obtained in step (B) at a first temperature under such conditions as to at least partially dry said mixture; and (D) heating the at least partially dried mixture obtained in step (C) at a second temperature in the range of from about 200° C. to about 600° C., which is higher than said first temperature, under such conditions as to activate said mixture.

2. A process in accordance with claim 1, wherein said molybdenum and oxygen containing compound (a) is selected from the group consisting of molybdenum oxides and hydroxides, molybdenum blue, molybdic acids, ammonium and alkali metal orthomolybdates, ammonium and alkali metal dimolybdates, and alkali metal ammonium heptamolybdates, ammonium and alkali metal isomolybdates, phosphomolybdic acid and ammonium salts thereof; said copper compound (b) is selected from the group consisting of copper(II) carbonate, basic copper(II) carbonate, copper(II) hydrogen carbonate, copper(II) oxalate, copper(II) nitrate, copper(II) sulfate, copper(II) halides, copper(II) monocarboxylates containing 1-12 carbon atoms; and said phosphorus and oxygen containing compound is selected from the group consisting of $H_3PO_4$, $H_4P_2O_7$, $(HPO_3)_n$, $NH_4H_2PO_4$, $LiH_2PO_4$, $NaH_2PO_4$, $KH_2PO_4$, $CsH_2PO_4$, $(NH_4)_2HPO_4$, $Li_2HPO_4$, $Na_2HPO_4$, $K_2HPO_4$, $Cs_2HPO_4$, $Rb_2HPO_4$, $(NH_4)_3PO_4$, $Na_3PO_4$, $K_3PO_4$, $Cs_3PO_4$, $Rb_3PO_4$, ammonium and alkali metal pyrophosphates, ammonium and alkali metal metaphosphates, $H_3PO_3$, ammonium and alkali metal phosphites.

3. A process in accordance with claim 1, wherein said solution obtained in step (A) comprises about 0.002–1.0 mole/l Mo, about 0.001–0.5 mole/l Cu and about 0.005–5.0 mole/l P.

4. A process in accordance with claim 1, wherein said heating in step (C) is carried out at a temperature ranging from about 25° to about 200° C. and said heating in step (D) is carried out in a non-reducing gas atmosphere at a temperature ranging from about 300° C. to about 600° C.

5. A process in accordance with claim 1, wherein said molybdenum and oxygen containing compound is $MoO_3$, said copper compound (b) is basic copper(II) carbonate, and the phosphorus compound is $H_3PO_4$.

6. A process in accordance with claim 5, wherein the amounts dissolved in 1 liter of said solution comprises about 0.005–0.5 mole/l Mo, about 0.002–0.2 mole/l Cu and about 0.005–1.0 mole/l P.

7. A process in accordance with claim 1, wherein said alumina-containing support material has a surface area ranging from about 20 m²/g to about 350 m²/g.

8. A composition of matter, suitable as a catalyst composition, having been prepared by a process comprising the steps of:

(A) mixing (a) at least one molybdenum and oxygen containing compound, (b) at least one compound of divalent copper, (c) at least one phosphorus and oxygen containing compound, and (d) water, in such amounts and under such conditions as to obtain a solution;

(B) mixing the solution obtained in step (A) with an alumina-containing material;

(C) heating the mixture obtained in step (B) at a first temperature under such conditions as to at least partially dry said mixture; and (D) heating the at least partially dried mixture obtained in step (C) at a second temperature in the range of from about 200° C. to about 600° C., which is higher than said first temperature, under such conditions as to activate said mixture.

9. A composition of matter in accordance with claim 8, wherein said molybdenum and oxygen containing compound (a) is selected from the group consisting of molybdenum oxides and hydroxides, molybdenum blue, molybdic acids, ammonium and alkali metal orthomolybdates, ammonium and alkali metal dimolybdates, and alkali metal ammonium heptamolybdates, ammonium and alkali metal isomolybdates, phosphomolybdic acid and ammonium salts thereof; said copper compound (b) is selected from the group consisting of copper(II) carbonate, basic copper(II) carbonate, copper(II) hydrogen carbonate, copper(II) oxalate, copper(II) nitrate, copper(II) sulfate, copper(II) halides, copper(II) monocarboxylates containing 1-12 carbon atoms; and said phosphorus and oxygen containing compound is selected from the group consisting of $H_3PO_4$, $H_4P_2O_7$, $(HPO_3)_n$, $NH_4H_2PO_4$, $LiH_2PO_4$, $NaH_2PO_4$, $KH_2PO_4$, $CsH_2PO_4$, $(NH_4)_2HPO_4$, $Li_2HPO_4$, $Na_2HPO_4$, $K_2HPO_4$, $Cs_2HPO_4$, $Rb_2HPO_4$, $(NH_4)_3PO_4$, $Na_3PO_4$, $K_3PO_4$, $Cs_3PO_4$, $Rb_3PO_4$, ammonium and alkali metal pyrophosphates, ammonium and alkali metal metaphosphates, $H_3PO_3$, ammonium and alkali metal phosphites.

10. A composition of matter in accordance with claim 8, wherein said solution obtained in step (A) comprises about 0.002–1.0 mole/l Mo, about 0.001–0.5 mole/l Cu, and about 0.005–5.0 mole/l P.

11. A composition of matter in accordance with claim 8, wherein said heating in step (C) is carried out at a temperature ranging from about 25° C. to about 200° C. and said heating in step (D) is carried out in a non-reducing gas atmosphere at a temperature ranging from about 300° C. to about 600° C.

12. A composition of matter in accordance with claim 8, wherein said molybdenum and oxygen containing compound (a) is $MoO_3$, said copper compound (b) is basic copper(II) carbonate, and said phosphorus and oxygen containing compound (c) is $H_3PO_4$.

13. A composition of matter in accordance with claim 8 comprising from about 0.1 to about 5.0 weight-% Mo, based on the weight of the entire catalyst composition; from about 0.02 to about 2.5 weight-% of Cu, based on the weight of the entire catalyst composition; from about 0.001 to about 10 weight-% P, based on the weight of the entire catalyst composition, and having a surface area ranging from about 20 m²/g to about 350 m²g.

14. A composition of matter in accordance with claim 8, comprising from about 0.3 to about 2.0 weight-% Mo, based on the entire catalyst composition; from about 0.05 to about 1.0 weight-% of Cu, based on the entire catalyst composition; from about 0.01 to about 6.0 weight-% P, based on the entire catalyst composition; and having a surface area ranging from about 100 to about 250 m²/g.

* * * * *